June 17, 1924.

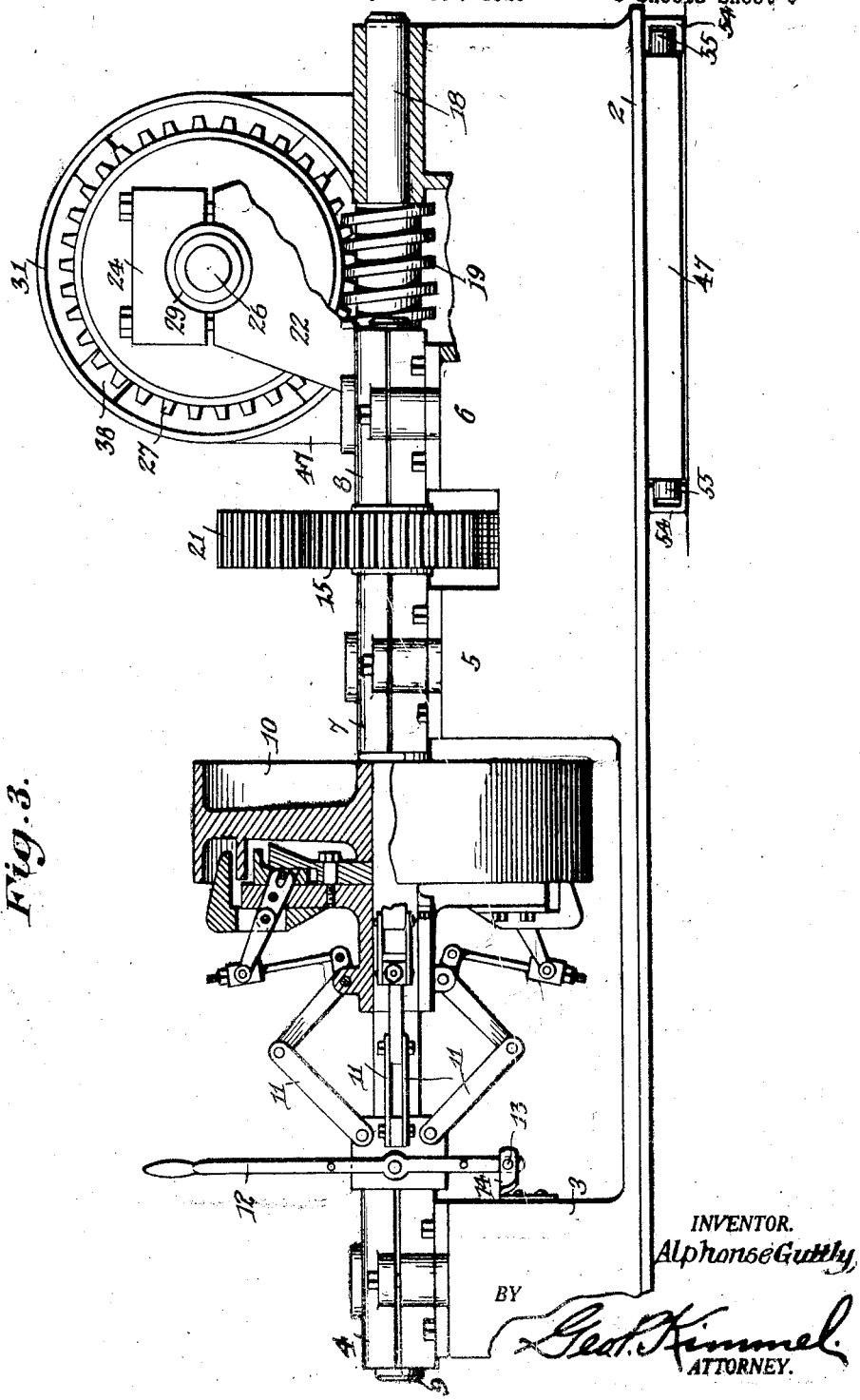

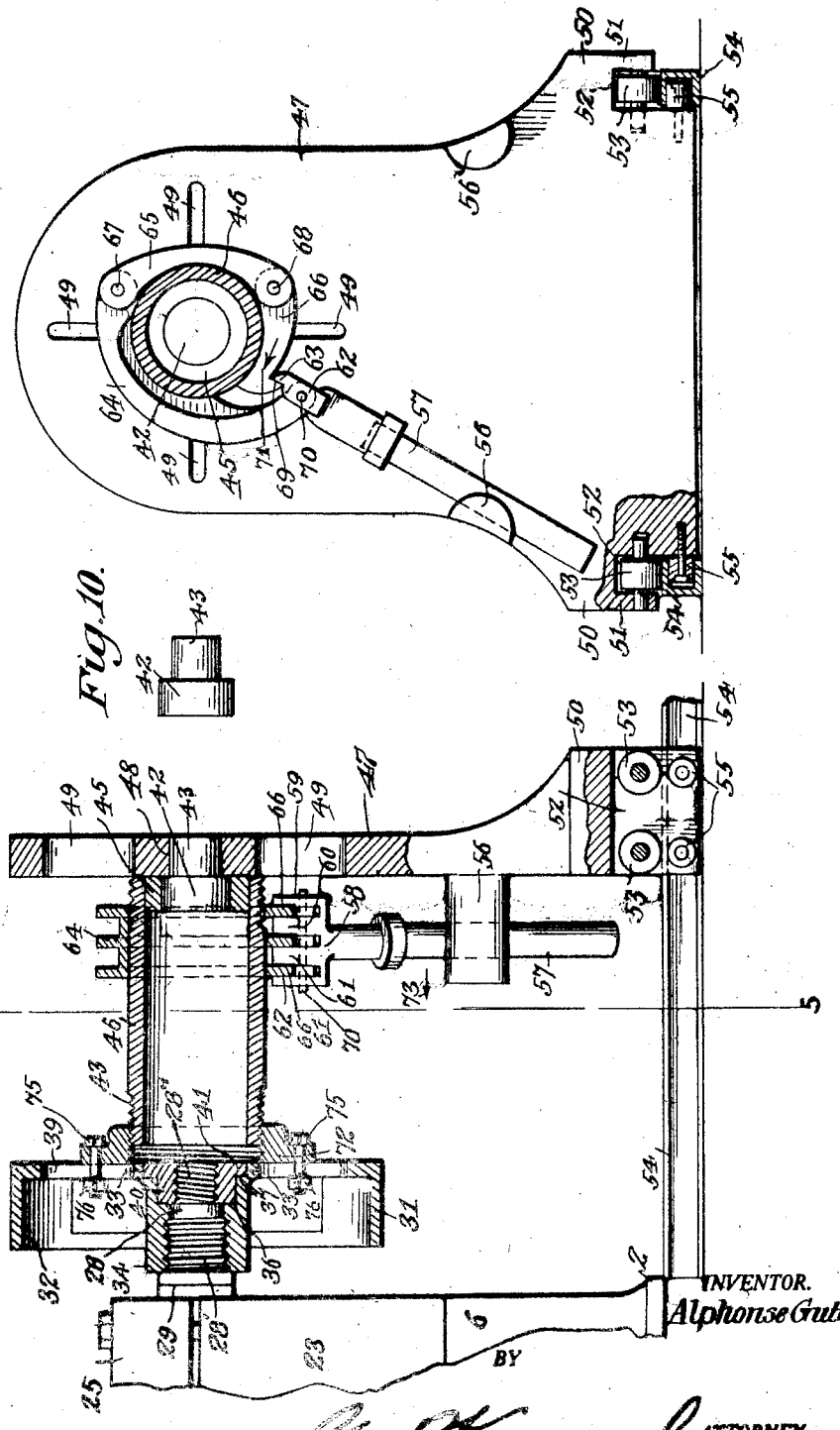

A. GUTTLY 1,498,451

PIPE FLANGE ATTACHING MACHINE

Filed April 10, 1923   5 Sheets-Sheet 5

INVENTOR.
*Alphonse Guttly,*
BY
*Geo. Kimmel.*
ATTORNEY.

Patented June 17, 1924.

1,498,451

UNITED STATES PATENT OFFICE.

ALPHONSE GUTTLY, OF WISCONSIN RAPIDS, WISCONSIN.

PIPE-FLANGE-ATTACHING MACHINE.

Application filed April 10, 1923. Serial No. 631,174.

*To all whom it may concern:*

Be it known that I, ALPHONSE GUTTLY, a citizen of Switzerland, residing at Wisconsin Rapids, in the county of Wood and State of Wisconsin, have invented certain new and useful Improvements in Pipe-Flange-Attaching Machines, of which the following is a specification.

This invention relates to a pipe flange attaching machine, and is designed primarily for use in connection with the positioning of large pipe flanges, by way of example from ten to thirty inches in diameter, on the screw threaded ends of pipe sections, but it is to be understood that a machine in accordance with this invention can be employed for any purposes wherein it is found applicable, and the invention has for its object to provide, in a manner as hereinafter set forth, a machine of such class, having means in a manner as hereinafter referred to, for expeditiously connecting or positioning flanges of large diameter on the end or ends of a hollow tubular member, such as a pipe section thereby overcoming the employment of the large number of workmen required under existing conditions, for placing or connecting or positioning a flange of large diameter on the end of a pipe section whereby a great saving in labor and expense is had.

A further object of the invention is to provide a machine for the purpose set forth, having means in a manner as hereinafter referred to, whereby the machine is adapted for use in positioning or connecting large flanges of varying diameters on the end or ends of a pipe section.

Further objects of the invention are to provide in a manner as hereinafter referred to, a machine for the purpose set forth, which is comparatively simple in its construction and arrangement, strong, durable, compact, thoroughly efficient and convenient in its use, readily assembled and comparatively inexpensive to install.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 3 is a sectional side elevation.

Figure 4 is a sectional elevation illustrating chuck, mandrel and clamping wrench, and further showing the adaptation of said elements with respect to the pipe and the flange connected to one end thereof.

Figure 5 is a section on line 5—5, Figure 4.

Figure 10 is a view of the pipe centering mandrel.

Figure 1:
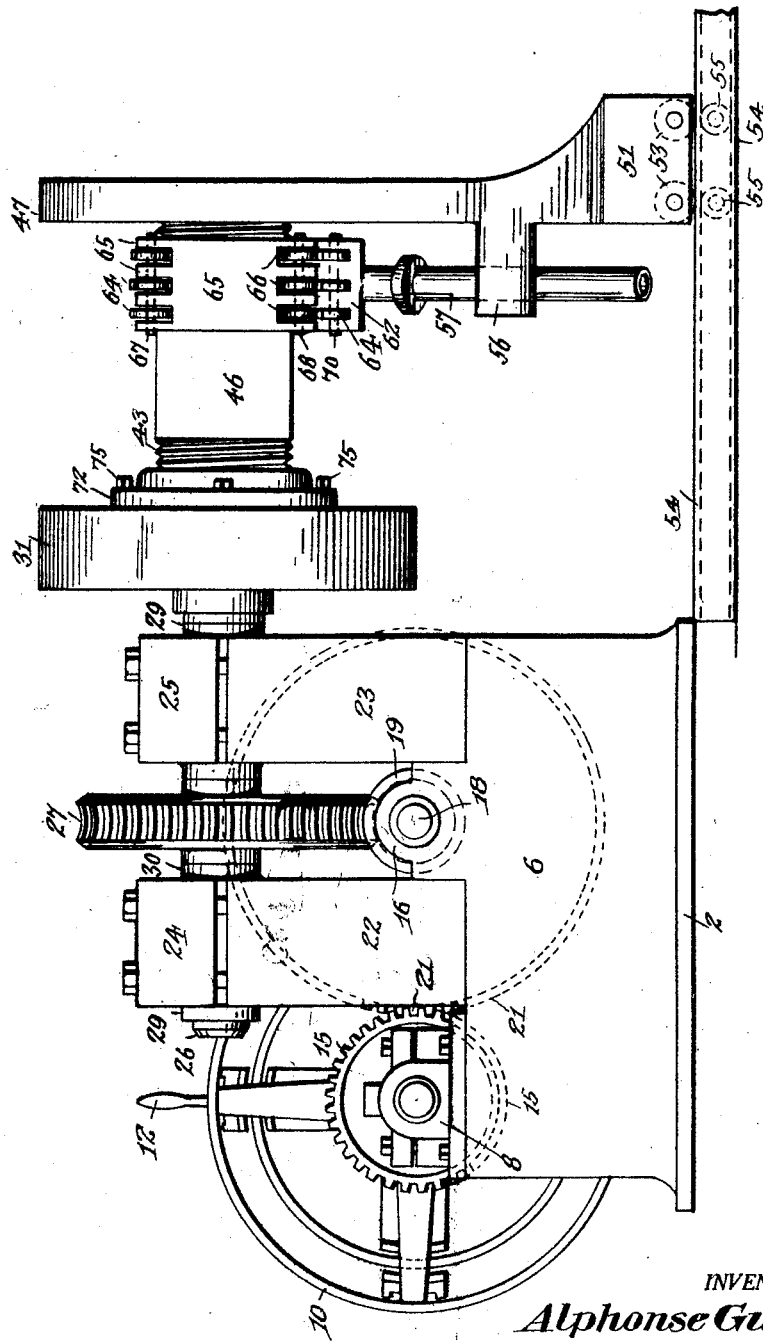
Figure 1 is an elevation of a pipe flange attaching machine in accordance with this invention.
Figure 2:
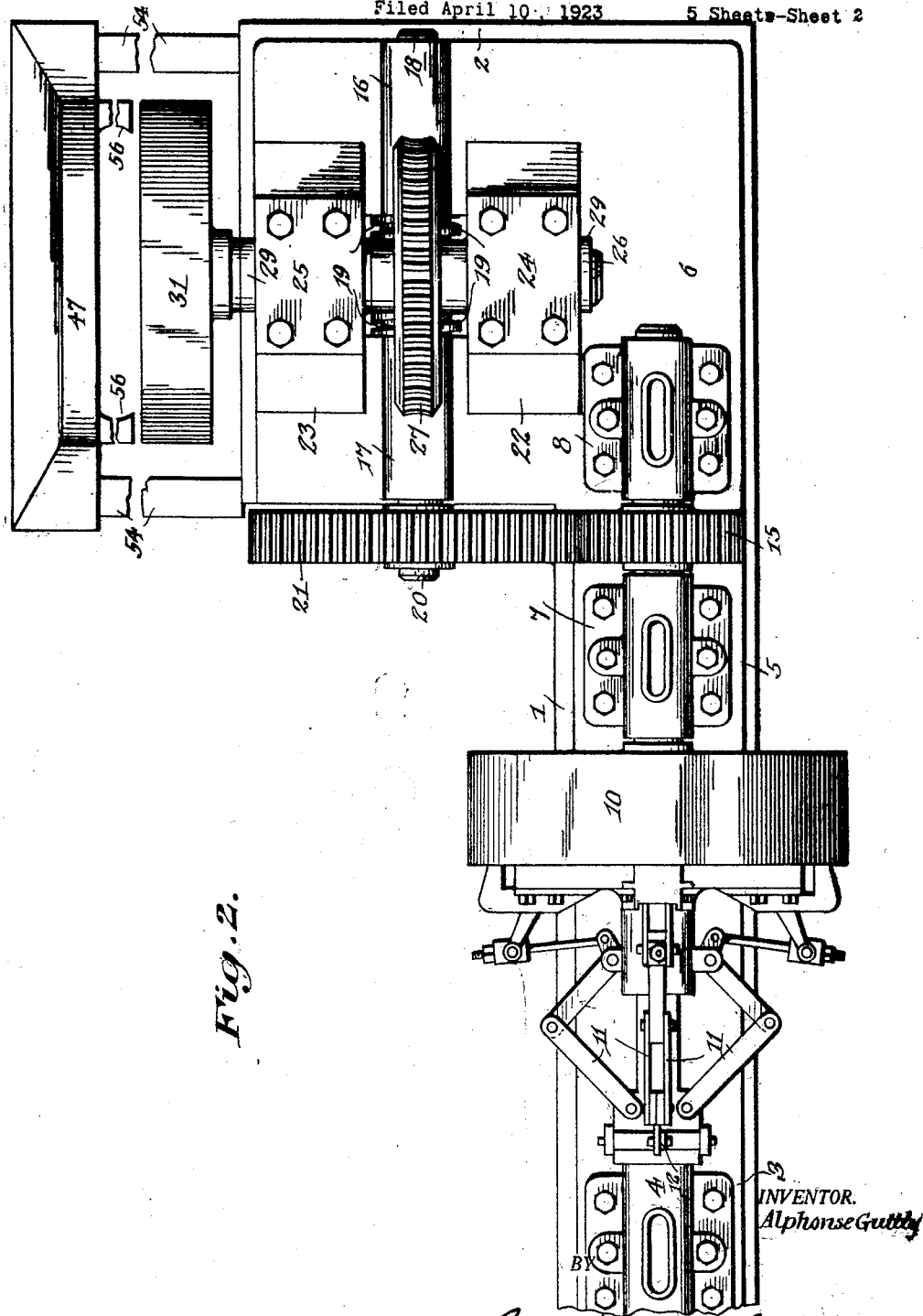
Figure 2 is a top plan, broken away.
Figure 7:
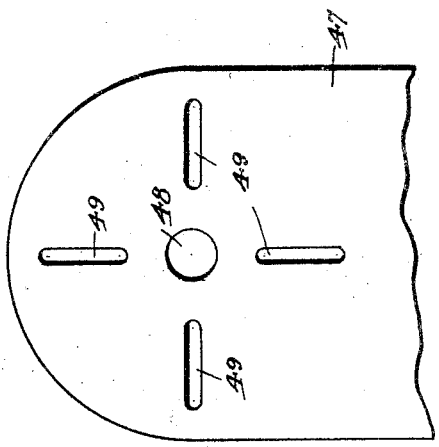
Figure 7 is a front elevation, broken away, of the holder.
Figure 9:
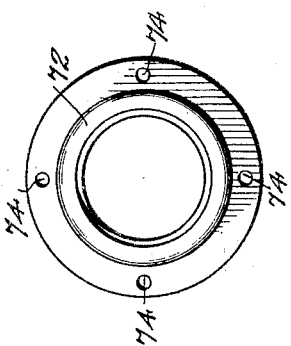
Figure 9 is a view of a flange.

Referring to the drawings in detail, 1 denotes a base formed at one end with a right angular extension 2, and at its other end with a standard 3, carrying bearings 4. The base is furthermore provided with standards 5, 6, the former is spaced from the standard 3 and the latter from the standard 5. The standard 6 opposes the standard 5 and the latter opposes the standard 3. Secured to the standards 5, 6, are bearings 7, 8, respectively. Journaled in the bearings 4, 7 and 8 is a longitudinally extending operating shaft 9 having loosely mounted thereon a driving pulley 10, which is adapted to be connected with a prime mover, not shown.

Connected with the shaft 9, so as to rotate therewith, as well as being longitudinally shiftable thereon, is a clutching mechanism 11, which cooperates with the pulley 10, for the purpose of clutching the latter to the shaft 9 thereby providing for the operation of the latter. The shipper lever for the clutching mechanism 11 is indicated by the reference character 12, and which has its lower end pivoted, as at 13, to a bracket 14, secured to the standard 3. The pulley 10 is mounted on the shaft 9, between the standards 3 and 5.

Fixedly secured to the shaft 9, as well as moving therewith when the shaft 9 is driven, is a gear pinion 15, which is positioned on the shaft 9 between the standards 5 and 6.

The standard 6, extends at right angles to the standard 5, and is formed on the extension 2, and said standard 6 is furthermore provided with spaced aligning bearings 16, 17, extending in a plane parallel to the plane of the bearings 7 and 8, and mounted in the bearings 16, 17, is a shaft 18, provided medially thereof with a worm 19. The shaft 18 projects from the bearing 17, as at 20, and carries an enlarged gear wheel 21 which is in mesh with the pinion 15, and by this arrangement when the shaft 9 is operated, the worm shaft 18 will be driven.

Mounted on the standard 6, at each side of the bearings 16, 17, as well as medially of said standard 6, is a pair of vertically disposed supports 22, 23 which are arranged in parallelism and are spaced from each other. To the upper ends of the supports 22, 23, are secured bearings 24, 25, respectively, for a chuck operating shaft 26, which is provided centrally thereof with a worm wheel 27 in mesh with the worm 19. The shaft 26 projects beyond the free end of the extension 2 and is formed with a reduced end terminal 28, provided with right and left threads 28', 28'', respectively. To prevent lengthwise shifting of the shaft 26, it is provided with collars 29 which abut against the supports 22, 23, and said shaft 26 is furthermore provided with collars 30 to arrest the worm wheel 27 shifting lengthwise of the shaft.

The chuck which is operated by the shaft 26 comprises a circular body portion 31 having formed integral therewith a rearwardly directed annular flange 32. The body portion 31 is formed with a centrally disposed opening 33 and a rearwardly directed annular hub 34, which for a portion of the length of its inner face is interiorly threaded, as at 25 and engages with the threads 28'. The inner face of the hub 34, at the forward end thereof, is cut away to provide a shoulder 36 and a seat 37. The opening formed by the hub 34 is in alignment with the opening 33. The hub 34 is formed integral with the rear face of the body portion 31. Extending from the inner face of the flange 32, to the hub 34, as well as being formed integral with said flange 32 and hub 34 is a series of radially disposed reinforcing webs 38 and which are also formed integral with the rear face of the body portion 31. Between the webs 38, the body portion 31 is provided with radially extending slots 39.

Mounted in the opening 33 and extending into the hub 34, is a shaft connecting element, and said element is anchored in the chuck in a manner whereby it will be carried with the chuck during the operation thereof, and the said element consists of an interiorly threaded cylindrical body portion 40, formed with an outwardly extending annular flange 41. The body portion 40, when the connecting element is mounted in position, is arranged against the shoulder 36, and the flange 41 of said body portion 40 is positioned against the seat 37, as more clearly shown in Figure 4. The threads of said element engage with the threads 28' of the shaft 28. The right and left threads hold the chuck from turning in either direction on the shaft 28.

The machine further includes a pipe centering device formed of a mandrel 42 for the purpose of receiving cylindrical pipe supports or bushings 45 of varying diameters and upon which is mounted one end of the pipe 46 to be flanged. The support or bushing 45 is of the same length as the length of the mandrel 42, as shown in Figure 4 and has its outer diameter such as to provide for a sliding fit therebetween and the pipe 46.

Cooperating with the centering mandrel 42, is a portable, vertically disposed stand 47, provided with an opening 48 for the reception of the reduced end 43 of the mandrel 42 which is secured therewith in any suitable manner. The stand 47 is furthermore provided with a series of spaced slots 49, for a purpose to be hereinafter referred to.

The lower end of the stand 47, at each side thereof, is offset as at 50, and the said offset portion has a depending arm 51, which forms a groove 52. Mounted in each of the grooves 52, are rollers 53, which travel on the top of the channel-shaped track members 54, positioned below the lower face of the base 1, or rather the extension 2 of said base 1. The track members 54 project outwardly from said extension, and extending in each of said track members, are rollers 55 carried by the lower part of the stand 47. The stand 47 extends between the track members 54 and is suspended slightly above the base of the track members through the medium of the rollers 53 and 55. The stand 47 is shiftable towards and from the chuck on said track members.

The stand 47, has that face opposing the chuck, provided near the offset portion 50, with a pair of opposed abutment arms 56, which project towards the chuck and have concave inner sides.

The pipe 46 when mounted on a support 45, is held thereon from turning during the operation of the chuck, by means of a retaining element or wrench and which consists of a shank 57, positioned against the abutment arms 56 and which terminates in a head 58 formed with a series of furcations as indicted at 59, 60, 61 and 62. The head 58, at its upper end is cut away to provide a nose 63. Carried by the head 58 is a series of sets of clamping jaws and each set consists of three cam shaped jaws 64, 65 and 66. The jaws are curvilinear in contour, and the jaw 64 is of greater length than the jaw 65 and with the latter of greater length than the jaw 66. The jaw 64 is pivotally connected with the jaw 65, as at 57, and the jaw 65 is pivotally connected to the jaw 66, as at 68. One end of the jaw 66 is free and is formed with a protuberance 69 which is engaged by the nose 63.

The jaws 64 of the said sets of jaws extend into the head 68 and with one jaw positioned between the furcations 59, 60, another jaw 64 between the furcations 60, 61 and the other jaw 64 between the furcations 61, 62. The jaws 64 of the said sets are pivotally connected with the head 58 by a pivot pin 60, which is common to the said jaws 64.

The manner in which the jaws of the retaining element or wrench are set up with respect to the pipe 46 is shown in Figure 5, and if the chuck is moving in the direction of the arrow 71, the jaws will be brought into clamping engagement against the pipe 46, so as to prevent the pipe 46 rotating, but the retaining element is so set up as to allow of the pipe 46 being drawn towards the chuck, so that the flange 72 can be threaded on the end of the pipe, as shown in Figure 4. When the pipe 45 moves towards the chuck for the purpose of threading the flange 72 thereon, the retaining element moves with the pipe and with the shank 57 shifting on the abutment arm 56. The direction of movement of the retaining element towards the chuck is indicated by the arrow 73, in Figure 4.

When the jaws of the retaining element are shifted in the direction opposite to that as indicated by the arrow 71, the pipe 46 is released and it can be removed from the support 45.

The flange 72 is formed with a series of openings 74 through which extend headed bolts 75, and these latter are employed for fixedly securing the flange 72 to the chuck, and in this connection the bolts 75 are extended through the slots 39 and have their inner ends provided with clamping nuts 76, which engage against the inner face of the body portion 41, as shown in Figure 4. The slots 39 are of substantial length so that flanges of varying sizes can be fixedly secured to the chuck.

Figure 6:
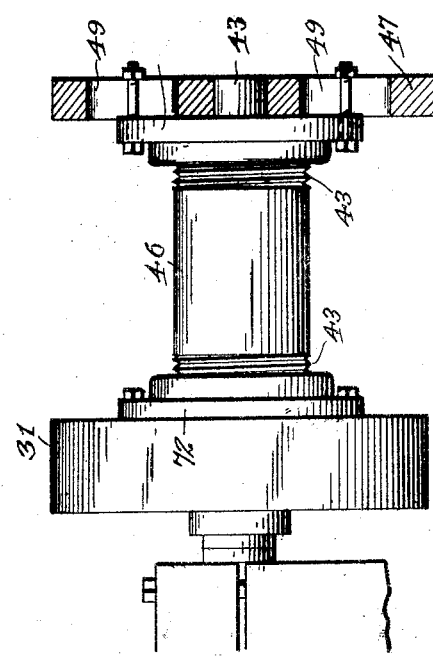
Figure 6 is a view illustrating a pipe having the flange secured to each end thereof and further illustrating the pipe with respect to the chuck.
Figure 8:
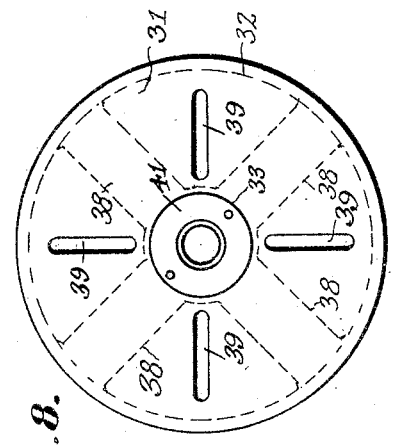
Figure 8 is a face view of the chuck.

In Figure 6 of the drawings, the pipe is shown as provided with a flange 72 at each end, and in this connection, after the flange 72 has been placed on one end of the pipe 46, the retaining element or wrench is removed, the stand 47 shifted rearwardly and a flange 72 secured to the stand as shown in Figure 6. The stand 47 is moved towards the mandrel 42 for the reception of the reduced end 44 thereof and with the flange 72 positioned against the end of the pipe 46 opposite to that end provided with the flange 72. When the parts are in the position as stated, the chuck is operated, carrying the pipe 46 therewith, thereby causing the threading of the flange 72, carried by the stand 47, on the end of the pipe 46.

The machine is not only adapted for screwing the flanges on the ends of pipe, but also for removing the flanges as well. When the flanges are screwed on the pipe ends the shank 57 is positioned against the lug 56, at the right hand side of the stand 47, and when the flanges are to be removed from the pipe ends the shank 57 is arranged against the lug 56 at the left hand side of the stand 47.

From the foregoing construction taken in connection with the accompanying drawings, a pipe flange attaching machine is set up which provides for the expeditiously positioning of large flanges on the end or ends of pipe sections, and although the preferred embodiment of the invention is as illustrated and described, yet it is to be understood that changes in the details of construction can be had which will fall within the light of the invention as claimed.

What I claim is:—

1. A pipe flange attaching machine comprising a revolvable chuck, means for detachably connecting a pipe flange against the front face thereof, a non-rotative pipe support spaced from and opposing the chuck and constituting means for supporting one end of and positioning a pipe for the reception on its other end of the flange carried by the chuck, and an adjustable stand opposing said chuck and carrying said positioning means.

2. A pipe flange attaching machine comprising a revolvable chuck, means for detachably connecting a pipe flange against the front face thereof, a non-rotative pipe support spaced from and opposing the chuck and constituting means for supporting one end of and positioning a pipe for the reception on its other end of the flange carried by the chuck, an adjustable stand opposing said chuck and carrying said positioning means, and a retaining element engageable with that end of the pipe on said positioning means to prevent rotative movement of the pipe during the operation of the chuck.

3. A pipe flange attaching machine comprising a revolvable chuck, means for detachably connecting a pipe flange against the front face thereof, a non-rotative pipe support spaced from and opposing the chuck and constituting means for supporting one end of and positioning a pipe for the reception on its other end of the flange carried by the chuck, and an adjustable stand opposing said chuck and carrying said positioning means, said stand provided with means for connecting a flange therewith to provide for the positioning of such flange on the supported end of the pipe.

4. A pipe flange attaching machine comprising a revolvable chuck having means for detachably connecting pipe flanges of varying diameters against the front face thereof, a non-rotative pipe supporting and positioning means extended towards the chuck and capable of supporting one end of pipes of varying diameters for positioning the pipe to receive the flanges carried by the chuck, and an adjustable stand opposing the chuck and carrying said positioning means.

5. A pipe flange attaching machine comprising a revolvable chuck having means for detachably connecting pipe flanges of varying diameters to the front face thereof, a non-rotative pipe supporting and positioning means extended towards the chuck and capable of supporting one end of pipes of varying diameters for positioning the pipes to receive the flange carried by the chuck, an adjustable stand opposing the chuck and carrying said positioning means, and a retaining element engageable with the pipes when mounted on said positioning means to prevent rotative movement of the pipes during the operation of the chuck, said retaining element being releasable and engageable with said stand.

6. A pipe flange attaching machine comprising a revolvable chuck, means for detachably connecting a pipe flange to the front face thereof, a non-rotative pipe support spaced from and opposing the chuck and constituting means for supporting one end of and positioning a pipe for the reception on its other end of the flange carried by the chuck, an adjustable stand opposing said chuck and carrying said positioning means, and means for controlling the operation of said chuck.

7. A pipe flange attaching machine comprising a revolvable chuck, means for detachably connecting a pipe flange to the front face thereof, a non-rotative pipe support spaced from and opposing the chuck and constituting means for supporting one end of and positioning a pipe for the reception on its other end of the flange carried by the chuck, an adjustable stand opposing said chuck and carrying said positioning means, a retaining element engageable with that end of the pipe on said positioning means to prevent rotative movement of the pipe during the operation of the chuck, and means for controlling the operation of the said chuck.

8. A pipe flange attaching machine comprising a revolvable chuck having means for detachably connecting pipe flanges of varying diameters to the front face thereof, a non-rotative pipe supporting and positioning means extended towards the chuck and capable of supporting one end of pipes of varying diameters for positioning the pipes to receive the flanges carried by the chuck, an adjustable stand opposing the chuck and carrying said positioning means, and means for controlling the operation of said chuck.

9. A pipe flange attaching machine comprising a revolvable chuck having means for detachably connecting pipe flanges of varying diameters to the front face thereof, a non-rotative pipe supporting and positioning means capable of supporting one end of pipes of varying diameters for positioning the pipes to receive the flanges carried by the chuck, an adjustable stand opposing the chuck and carrying said positioning means, a retaining element engageable with that end of the pipes mounted on said positioning means to prevent rotative movement of the pipes during the operation of the chuck, said retaining element being releasably engageable with said stand, and means for controlling the operation of said chuck.

10. A pipe flange attaching machine comprising a non-rotative pipe supporting and positioning means adapted to extend into one end of the pipe, a revolvable chuck provided with means for detachably connecting flanges of varying diameters to the front face thereof whereby the flange will be arranged for threading on the pipe carried by said positioning means when the chuck is operated, an adjustable stand cooperating with and constituting a support for one end of said positioning means to arrange the latter in cooperative relation with respect to the chuck, and a retaining element engageable with the pipe carried by said positioning means to prevent rotative movement of the pipe during the threading thereon by the flange carried by the chuck.

11. A pipe flange attaching machine comprising a non-rotative pipe supporting and positioning means adapted to extend into one end of the pipe, a revolvable chuck provided with means for detachably connecting flanges of varying diameters to the front face thereof whereby the flange will be arranged for threading on the pipe carried by said positioning means when the chuck is operated, an adjustable stand cooperating with and constituting a support for one end of said positioning means to arrange the latter in cooperative relation with respect to the chuck, and a retaining element engageable with the pipe carried by said positioning means to prevent rotative movement of the pipe during the threading thereon by the flange carried by the chuck, said stand provided with means for connecting flanges of varying diameters therewith whereby the flange carried by said stand can be threaded on the pipe when the retaining element is released.

12. A pipe flange attaching machine comprising a non-rotative pipe supporting and positioning means adapted to extend into one end of the pipe, a revolvable chuck provided with means for detachably connecting flanges of varying diameters to the front face thereof whereby the flange will be arranged for threading on the pipe carried by said positioning means when the chuck is operated, an adjustable stand cooperating with and constituting a support for one end of said positioning means to arrange the latter in cooperative relation with respect to the chuck, a retaining element engageable with the pipe carried by said positioning means to prevent rotative movement of the pipe during the threading thereon by the flange carried by the chuck, and means for controlling the operation of said chuck.

13. A pipe flange attaching machine comprising a revolvable chuck, means for detachably connecting a pipe flange therewith, a non-rotative mandrel, a portable stand having said mandrel extending therein, a non-rotative pipe support mounted on the mandrel, and a retaining element engaging with the pipe on said support to prevent rotative movement of the pipe during the operation of the chuck shifting the flange with respect to the pipe.

14. A pipe flange attaching machine comprising a pipe flange revolving chuck, a stationary means spaced from and opposing the chuck and constituting a support for a pipe to receive or have removed from one end thereof the flange revolved by the chuck, said means extending in the other end of the pipe for supporting it with respect to the chuck and operating means for the chuck causing thereby the threading of the flange on or off one end of the pipe.

15. A pipe flange attaching machine comprising a flange carrying chuck, a stationary means spaced from and opposing the chuck and constituting a support for a pipe to receive on one end thereof the flange carried by the chuck, said means extending into the other end of the pipe for supporting it with respect to the chuck, operating means for the chuck causing thereby the threading of the flange on the end of the pipe, and means to provide for detachably connecting flanges of varying diameters to the chuck.

16. A pipe flange attaching machine comprising a revolvable chuck provided with means for detachably connecting a pipe flange to the front face thereof, an adjustable stand spaced from and opposing the chuck and provided with means for detachably connecting said pipe flange to that face thereof opposing the chuck, means carried by said stand and projecting towards the chuck for supporting a pipe to receive on its ends the flanges carried by the chuck and the stand, said supporting means extending in one end of the pipe and means to provide for the operation of the chuck causing thereby the securing of the flanges on the ends of the pipe.

17. A pipe flange attaching machine comprising a revolvable chuck, means for detachably connecting a pipe flange against the front face thereof, a non-rotative pipe support spaced from and opposing the chuck and constituting means for supporting one end of and positioning a pipe for the reception on its other end of the flange carried by the chuck, an adjustable stand opposing said chuck and carrying said positioning means, and a trackway upon which said stand is adjusted.

18. A pipe flange attaching machine comprising a revolvable chuck, means for detachably connecting a pipe flange against the front face thereof, a non-rotative pipe support spaced from and opposing the chuck and constituting means for supporting one end of and positioning a pipe for the reception on its other end of the flange carried by the chuck, an adjustable stand opposing said chuck and carrying said positioning means, and a trackway upon which stand is adjusted, said stand provided with means for connecting a flange therewith to provide for the positioning of such flange on the supported end of the pipe.

19. A pipe flange attaching machine comprising a revolvable chuck, means for detachably connecting a pipe flange against the front face thereof, a non-rotative pipe support spaced from and opposing the chuck and constituting means for supporting one end of and positioning a pipe for the reception on its other end of the flange carried by the chuck, an adjustable stand opposing said chuck and carrying said positioning means, a trackway upon which said stand is adjusted, and a retaining element engaging with that end of the pipe on said positioning means to prevent rotative movement of the pipe during the operation of the chuck.

In testimony whereof, I affix my signature hereto.

ALPHONSE GUTTLY.